US012249219B2

(12) United States Patent
Casey et al.

(10) Patent No.: US 12,249,219 B2
(45) Date of Patent: *Mar. 11, 2025

(54) SYSTEMS AND METHODS FOR PROVIDING A MULTI-GAME BINGO GAME

(71) Applicant: Aristocrat Technologies, Inc., Las Vegas, NV (US)

(72) Inventors: Michael Casey, Reno, NV (US); Eric Telaak, Spring Hill, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,252

(22) Filed: Aug. 18, 2023

(65) Prior Publication Data

US 2023/0394928 A1 Dec. 7, 2023

Related U.S. Application Data

(63) Continuation of application No. 17/549,361, filed on Dec. 13, 2021, now Pat. No. 11,769,373, which is a continuation of application No. 16/852,014, filed on Apr. 17, 2020, now Pat. No. 11,210,905.

(60) Provisional application No. 62/862,601, filed on Jun. 17, 2019.

(51) Int. Cl.
*G07F 17/32* (2006.01)

(52) U.S. Cl.
CPC ...... *G07F 17/3267* (2013.01); *G07F 17/3211* (2013.01); *G07F 17/3286* (2013.01)

(58) Field of Classification Search
None
See application file for complete search history.

(56) References Cited

U.S. PATENT DOCUMENTS

| | | | | |
|---|---|---|---|---|
| 8,658,571 | B2 * | 2/2014 | van Driessche | C23C 18/1216 427/63 |
| 9,147,307 | B2 | 9/2015 | Meyer | |
| 10,445,974 | B2 | 10/2019 | Watkins | |
| 10,810,840 | B2 | 10/2020 | Casey | |
| 2004/0152503 | A1 | 8/2004 | Lind | |
| 2004/0152508 | A1 | 8/2004 | Lind | |
| 2005/0096119 | A1 | 5/2005 | Lind | |

(Continued)

FOREIGN PATENT DOCUMENTS

CA 2783272 C 3/2019

OTHER PUBLICATIONS

Office Action dated Apr. 26, 2021 for U.S. Appl. No. 16/852,014 (pp. 1-7).

(Continued)

*Primary Examiner* — Ronald Laneau
(74) *Attorney, Agent, or Firm* — Armstrong Teasdale LLP

(57) ABSTRACT

A gaming machine includes a processor configured to execute instructions, which when executed, cause the processor to at least control a display device to display a first subgame and a second subgame during a multi-game bingo game, evaluate a first bingo card to determine a first outcome for the first subgame, and evaluate a second bingo card to determine a second outcome for the second subgame. The instructions also cause the processor to control the display device to display the first outcome for the first subgame and the second outcome for the second subgame.

20 Claims, 7 Drawing Sheets

(56) References Cited

U.S. PATENT DOCUMENTS

| | | | | |
|---|---|---|---|---|
| 2005/0101370 | A1 | 5/2005 | Lind | |
| 2005/0119042 | A1 | 6/2005 | Chamberlain | |
| 2005/0164771 | A1 | 7/2005 | Lind | |
| 2005/0164772 | A1 | 7/2005 | Lind | |
| 2005/0255906 | A1 | 11/2005 | Lind | |
| 2006/0040727 | A1 | 2/2006 | Lind | |
| 2006/0135245 | A1 | 6/2006 | Hedrick | |
| 2006/0211496 | A1 | 9/2006 | Manz | |
| 2008/0153568 | A1 | 6/2008 | Lind | |
| 2009/0156296 | A1 | 6/2009 | Manz | |
| 2010/0210340 | A1 | 8/2010 | Lind | |
| 2012/0028696 | A1 | 2/2012 | Gail | |
| 2012/0172105 | A1 * | 7/2012 | Huynh | G07F 17/34<br>463/18 |
| 2012/0202575 | A1 | 8/2012 | Matsuno | |
| 2012/0315975 | A1 | 12/2012 | Lind | |
| 2013/0316785 | A1 | 11/2013 | Lind | |
| 2014/0221071 | A1 | 8/2014 | Calio | |
| 2015/0018067 | A1 | 1/2015 | Cuddy | |
| 2016/0307410 | A1 | 10/2016 | Cannon | |
| 2017/0004672 | A1 | 1/2017 | Coleman | |
| 2017/0113127 | A1 | 4/2017 | Hoover | |
| 2019/0102972 | A1 | 4/2019 | Watkins | |
| 2020/0013257 | A1 | 1/2020 | Watkins | |
| 2021/0082241 | A1 * | 3/2021 | Marsh | A63F 3/062 |
| 2022/0005309 | A1 | 1/2022 | Welch | |
| 2022/0076530 | A1 * | 3/2022 | Marks | G07F 17/3211 |

OTHER PUBLICATIONS

Office Action (Notice of Allowance and Fees Due (PTOL-85)) dated Aug. 30, 2021 for U.S. Appl. No. 16/852,014 (pp. 1-5).

Office Action (Non-Final Rejection) dated Apr. 17, 2023 for U.S. Appl. No. 17/549,361 (pp. 1-7).

Office Action (Notice of Allowance and Fees Due (PTOL-85)) dated May 31, 2023 for U.S. Appl. No. 17/549,361 (pp. 1-5).

* cited by examiner

SYSTEMS AND METHODS FOR PROVIDING A MULTI-GAME BINGO GAME

CROSS REFERENCE TO RELATED APPLICATIONS

This application is a continuation of and claims priority to U.S. patent application Ser. No. 17/549,361, filed Dec. 13, 2021, which is a continuation of U.S. patent application Ser. No. 16/852,014, now U.S. Pat. No. 11,210,905, filed Apr. 17, 2020, which claims the benefit of and priority to U.S. Provisional Patent Application No. 62/862,601, filed Jun. 17, 2019, which are hereby incorporated by reference in their entireties.

TECHNICAL FIELD

The field of disclosure relates generally to electronic gaming, and more particularly, to systems and methods for Class II electronic gaming, in which a multi-game bingo game is provided.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming machine is provided. The gaming machine includes a display device, a memory device, and a processor configured to execute instructions, which when executed, cause the processor to at least control the display device to display, at least, a first subgame and a second subgame during a multi-game bingo game; evaluate a first bingo card to determine a first outcome for the first subgame; evaluate a second bingo card to determine a second outcome for the second subgame; control the display device to display the first outcome for the first subgame and the second outcome for the second subgame; and evaluate a game ending win (GEW) bingo card to determine whether a game ending win has been achieved by a player of the electronic gaming machine, the GEW bingo card being different from the first bingo card and the second bingo card.

In another aspect, an electronic gaming system for providing a multi-game bingo game is provided. The electronic gaming system includes a server configured to generate a bingo number listing and an electronic gaming machine communicatively coupled to the server. The electronic gaming machine includes a display device, a memory device, and a processor configured to execute instructions stored in the memory device memory device, which when executed, cause the processor to at least: control the display device to display, at least, a first subgame and a second subgame; receive, from the server, at least a portion of the bingo number listing; evaluate a first bingo card against the portion of the bingo number listing to determine a first outcome for the first subgame; evaluate a second bingo card against the portion of the bingo number listing to determine a second outcome for the second subgame; control the display device to display the first outcome for the first subgame and the second outcome for the second subgame; and evaluate a plurality of game ending win (GEW) bingo cards against the portion of the bingo number listing to determine whether a game ending win has been achieved by at least one player of the bingo game.

In yet another aspect, a computer-implemented method for providing a multi-game bingo game is provided. The computer-implemented method includes controlling, by a processor of an electronic gaming machine, a display device of the electronic gaming machine to display, at least, a first subgame and a second subgame during the bingo game; evaluating, by the processor, a first bingo card to determine a first outcome for the first subgame; evaluating, by the processor, a second bingo card to determine a second outcome for the second subgame; and controlling, by the processor, the display device to display the first outcome for the first subgame and the second outcome for the second subgame.

DETAILED DESCRIPTION

Systems and methods for providing a multi-game bingo game are described herein. In various embodiments, a plurality of player selectable subgames are provided and displayed during the multi-game bingo game. In one example, four subgames are shown in four quadrants of a display screen. An outcome of each subgame may be determined based upon a respective (independent) bingo game outcome. For example, if four subgames are provided, four subgame bingo cards may be independently evaluated to generate four subgame outcomes, each of which may be displayed in one of the four quadrants.

Moreover, the multi-game bingo game may use a single bingo number listing (e.g., a ball call) to determine the outcome of the different subgames. For example, in the example in which four subgames are shown in four quadrants of the display screen, a bingo card may be selected for each of the four subgames. A single bingo number listing may then be generated and the independent bingo game outcomes may be determined by comparing each of the four bingo cards with the single bingo number listing. For example, in some such embodiments, a bingo server generates the single bingo number listing that is used to determine the outcome of each of the subgames. As a result, in such embodiments, the bingo server does not need to generate distinct bingo number listings for each subgame of the multi-game bingo game, thereby preserving memory and processing resources of bingo server.

In addition, the subgame outcomes may be associated with or mapped to any of a variety of game presentations, such as any Class III slot game presentation. In at least one embodiment, each subgame outcome is mapped from a bingo outcome to a reel game presentation. Each player participating in the multi-game bingo game may also be provided a game ending win bingo card, which may be associated, as described herein, with a nominal award value, and which may be used to determine a beginning and ending of each round of bingo, where each player may place many wagers for many subgame outcomes, during a single round of bingo. In some embodiments, a condition other than a GEW may be used to satisfy a requirement that a game of bingo be played by multiple players (in which case, players may or may not be provided GEW bingo cards).

Figure 1:
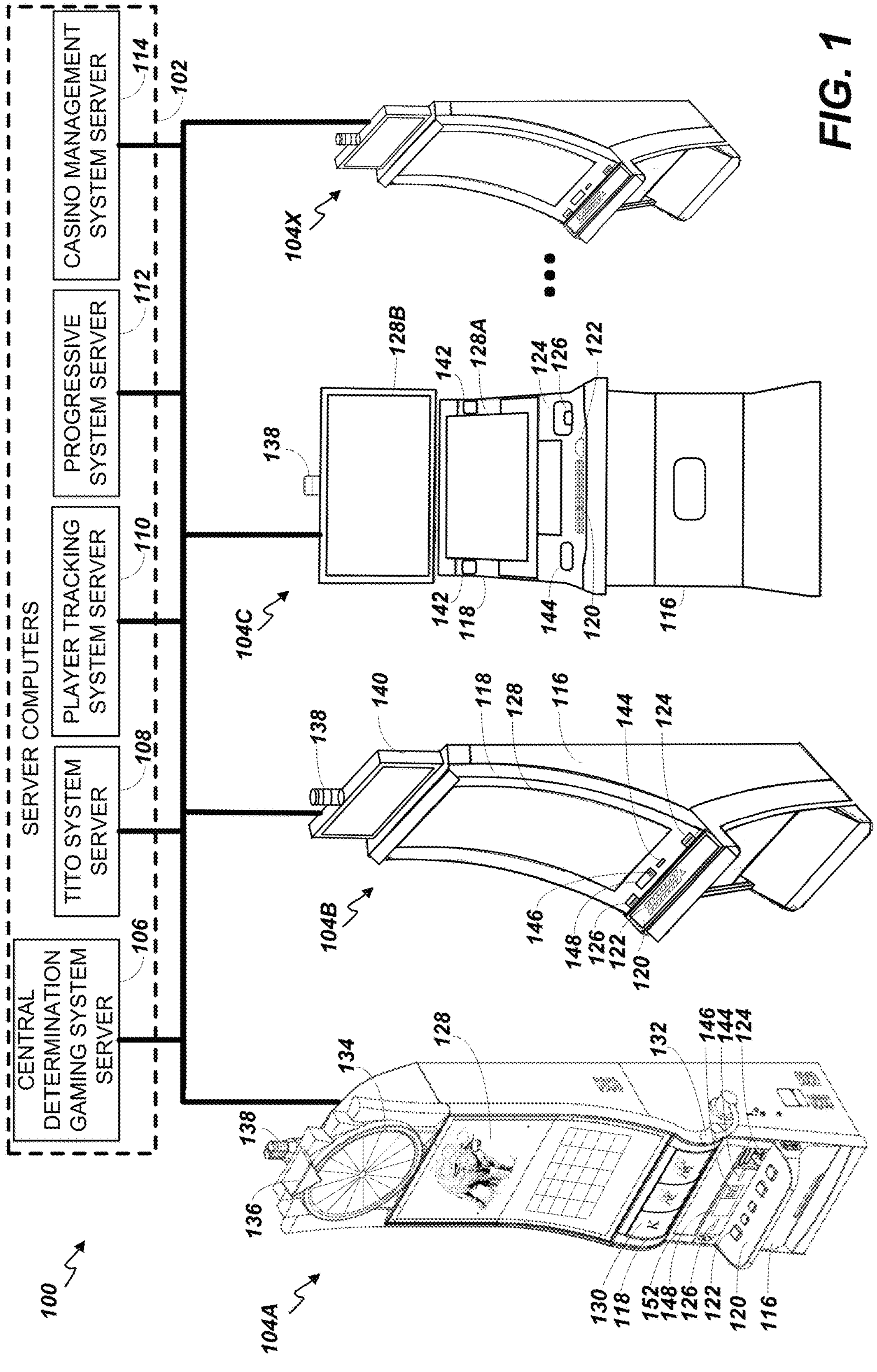
FIG. 1 is exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
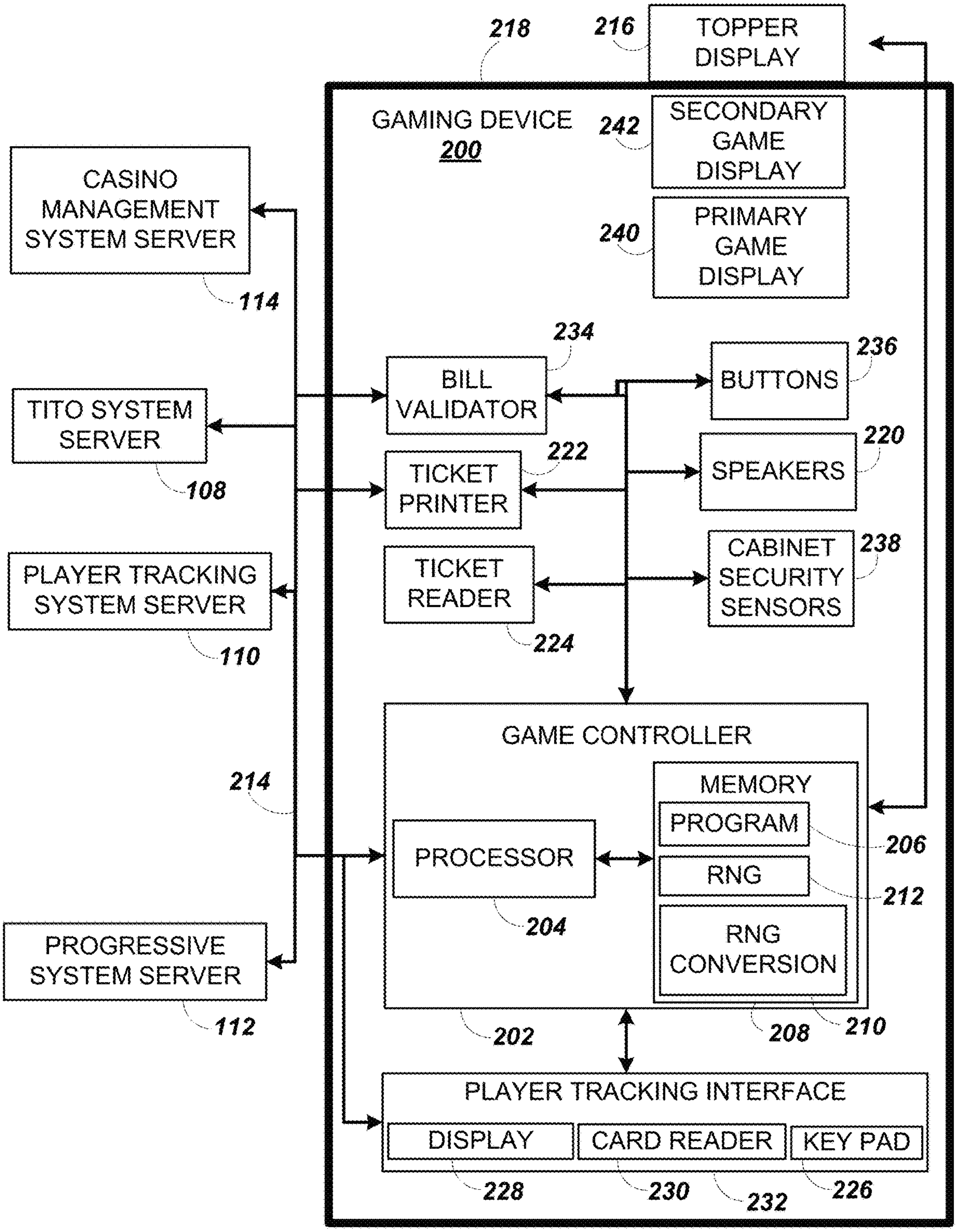
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
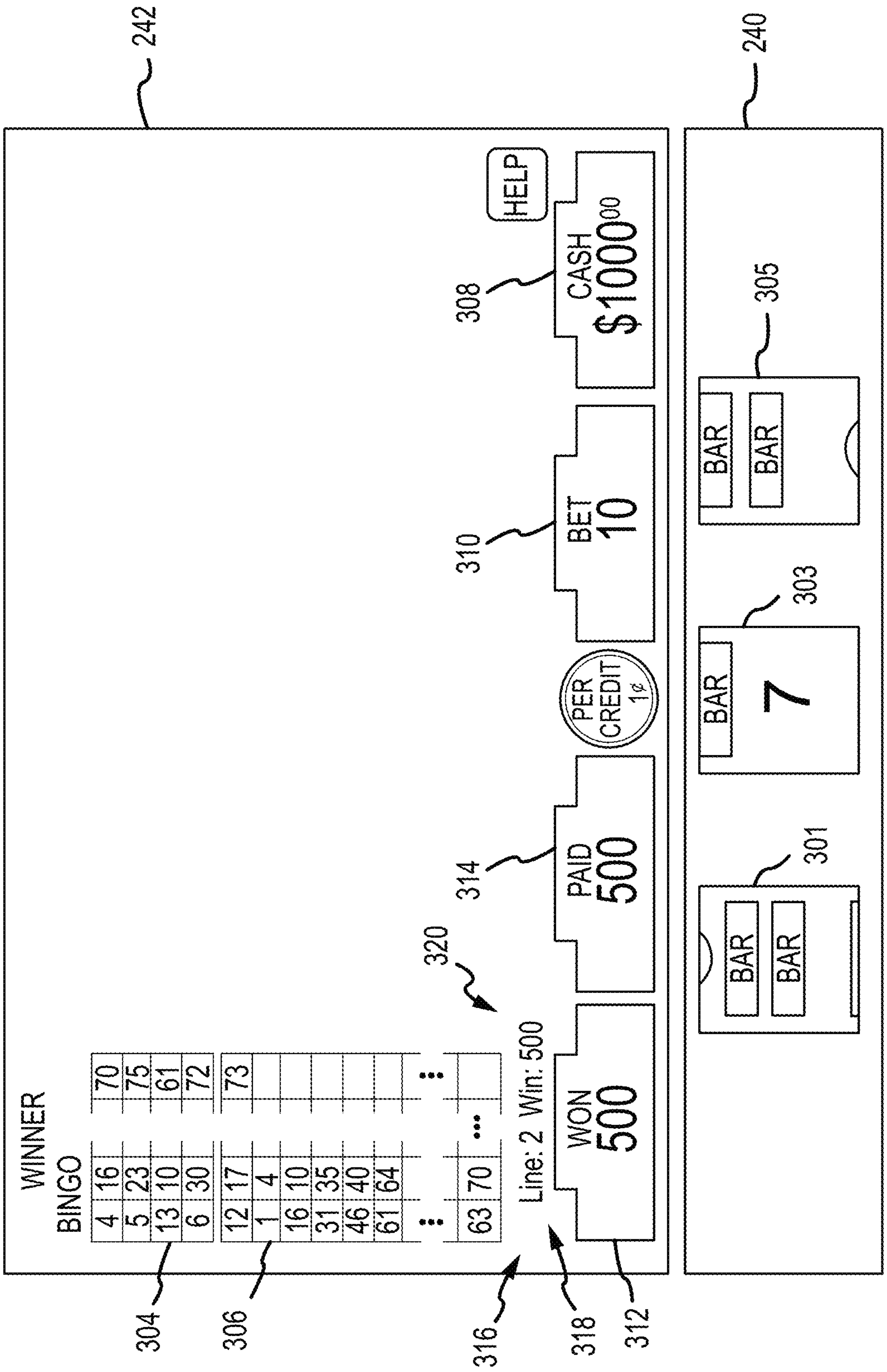
FIG. 3 is a screenshot of an example Class II bingo game being displayed on an EGM as shown in FIG. 2.

FIG. 3 depicts an example of a Class II bingo game being displayed in the primary game display 240 and secondary game display 242 of the EGM 200 of FIG. 2. In the example of FIG. 3, a plurality of reels 301, 303, and 305 are displayed within the primary game display 240. While only three reels 301, 303, 305 are shown in the example of FIG. 3, in some examples, more or fewer reels may be used. In some examples, the reels 301, 303, and/or 305 may be implemented as mechanical reels. As shown, each reel 301, 303, 305 has a plurality of symbol display positions for presenting symbols (and/or symbol combinations) which may be associated with winning and/or losing reel game outcomes and/or awards.

In the example of FIG. 3, a bingo card 304 and a bingo number listing 306 are displayed in the secondary game display 242. As shown, the bingo card 304 comprises a matrix of bingo cells 302 (e.g., squares). In some examples, the matrix may be a 5×5 matrix of total cells. In some examples, the bingo card 304 may have a matrix of a different size (e.g., 3×3, 4×4, 4×5, 4×6, 6×6, 7×7, 3×8, 10×10, etc.). In some examples, the matrix may be larger or smaller. In the example of FIG. 3, each cell 302 in the matrix of the bingo card 304 includes a number that is not repeated in any other cell of the bingo card 304.

In the example of FIG. 3, the secondary game display 242 further displays a credit meter 308 showing an amount of money and/or credits (e.g. credit balance) held by a player of the EGM 200. In the example of FIG. 3, the credit balance 308 shows $1000. The secondary display 242 additionally shows a wager meter 310 adjacent to the credit meter 308, under "BET." In the example of FIG. 3, the amount wagered is 10 credits (e.g., $0.10). The amount wagered (e.g., via the user interface) may be deducted from the credit meter 308. The secondary game display 242 additionally displays a win meter 312 and a total win meter 314. In the example of FIG. 3, the win meter 312 is 500, indicating that the simulated combination of symbols in reels 301, 303, 305 is associated with a 500 award (which is equal to the award associated with the bingo game outcome). As shown, the total win meter 314 is also 500, indicating that the cumulative total of awards received comprises just that one 500 credit award. In the example of FIG. 3, the secondary game display 242 further displays reel win information 316. The reel win information 316 includes win line information 318 and award information 320. The win line information 318 indicates which win line in the reels 301, 303, 305 contains symbols comprising a winning reel game outcome. The award information 320 indicates an associated award amount for that winning reel game outcome.

In some examples, the bingo game may be a networked game that involves two or more networked EGMs 200, such as EGMs 104A-104X. For example, many electronic bingo games are required, by state gaming regulations, to include at least two players. In other words, as a result of jurisdictional requirements, many Class II games are required (e.g., by law) to include greater than a single player. As a result, in these circumstances, a bingo game can only occur if two or more players have placed wagers and received a bingo card. As described in additional detail herein, a ball call is initiated once at least two players have joined an electronic bingo game (e.g., a networked electronic bingo game), and each player's bingo card (or cards) are compared to the same ball call (e.g., bingo number listing 306), even where the players are physically separated, such as in different parts of a casino or even in different casinos.

The bingo server 107 may manage (and/or host) the bingo game, such as by generating the bingo card 304 and/or bingo number listing 306. In some examples, the bingo card 304 (and/or information on which the bingo card 304 is based), and/or the bingo number listing 306 may be generated using an RNG. In some examples, the bingo card 304 may be randomly selected from a set of bingo cards or a player may select their own bingo card 304 (e.g., via the user interface), such as from a set of randomly generated bingo cards, for example. In certain embodiments, the bingo number listing 306 is a sequential listing of 80 numbers, selected randomly without replacement, from a pool of numbers. The bingo server 107 may generate this list at one go, or may generate a portion of this list (such as 40 numbers) first, and then sequentially generate one number after every n seconds. In certain embodiments, the bingo server may generate the list at once, and then transmit a portion (such as the first 40 numbers) to the various EGMS 200 and then transmit one number every n seconds, until a game end win occurs. At that point, the bingo game is complete, and a new bingo number listing is generated by the bingo server 107.

In operation, a player and/or EGM 200 may be provided with the bingo card 304, such as by bingo server 107. For example, a player may be provided a new bingo card 304 each time a "Spin" or "Play" button is pressed by the player (e.g., via user interface), provided the player has made a wager. In some examples, more than one bingo card 304 may be generated in response to wager. The bingo number listing 306 (e.g., "ball call") may be randomly generated, such as by bingo server 107. The bingo card 304 may be compared to the current bingo number listing 306, and numbered cells 302 on the bingo card 304 that match numbers in the bingo number listing 306 may be marked or "daubed" on the bingo card 304. Finally, the marked or daubed bingo card 304 may be evaluated against a paytable of winning bingo patterns.

The bingo number listing 306 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 306. Other game-ending patterns are also possible. When the game-ending pattern is awarded, the bingo number listing 306 is reset, and the process repeats. In some examples, a single play of the bingo game includes a wager, a bingo card, a bingo number listing 306, a matching of the numbers called with those on a bingo card 304, a determination of a bingo game outcome, and a presentation of an associated award, if any.

A bingo game outcome may be determined by comparing one or more patterns of marked (and/or "daubed) cells of the bingo card 304 with the paytable of winning bingo patterns. If the bingo card 304 does not include a pattern that matches a pattern in the paytable of winning patterns, then a losing bingo outcome is determined, and no award may be provided to the player. If the bingo card 304 does include a pattern that matches a pattern in the paytable of winning patterns, then a winning bingo outcome is determined, and an award may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g. all winning patterns) that are matched when the bingo card 304 is evaluated against the paytable of winning patterns. In some examples, the player may be awarded for only the highest priority pattern (e.g. the highest paying winning pattern) that is matched. In some examples, during play of a Class II game, a player is provided or selects a single bingo card 304 for multiple plays of the bingo game, with a new bingo number listing 306 generated for each play of the bingo game. Other methods of play of a Class II bingo game are also possible and are within the scope of this disclosure.

The bingo game outcome may be presented to the player via a spinning reel game simulation. In the example of FIG. 3, the spinning reel game is simulated via the plurality of reels 301, 303 and 305 in the primary game display 240. For each play of the bingo game, the bingo game outcome is presented as a reel spin outcome in the reel game. In some examples, the spinning reel game simulation may operate by spinning each reel 301, 303, 305 and then stopping each reel 301, 303, 305 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 301, 303 and 305. Similarly, a losing bingo game outcome may be displayed as a losing combination of reels 301, 303 and 305. Different outcomes of the bingo game may be displayed as different outcomes in the spinning reel game. Thus, the bingo game outcome is presented to the player as a particular reel spin outcome of reels 301, 303 and 305.

Figure 4:
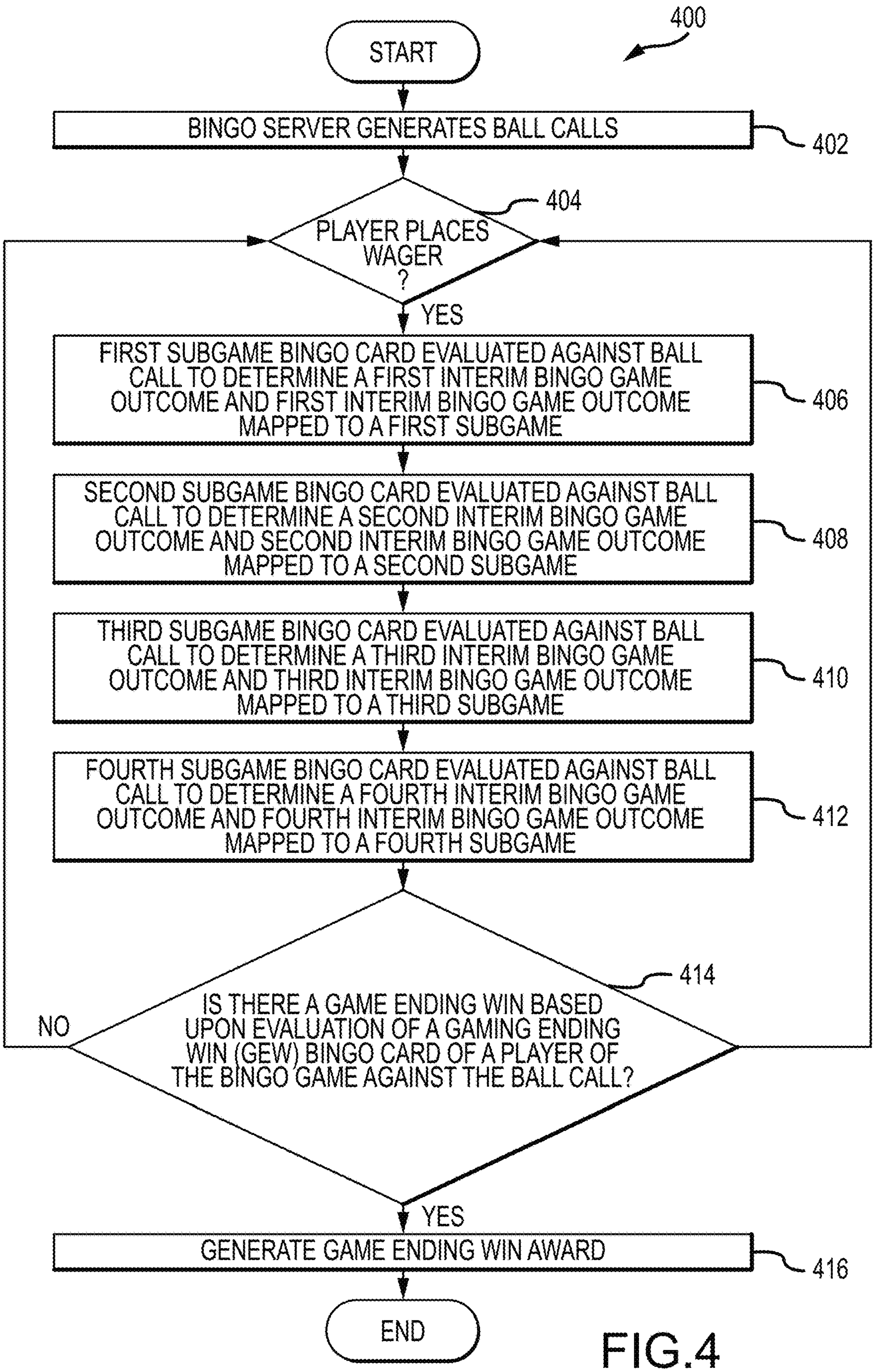
FIG. 4 is a flowchart illustrating a process for providing a Class II multi-game bingo game, in which each of a plurality of bingo cards are evaluated for interim wins.
Figure 5:
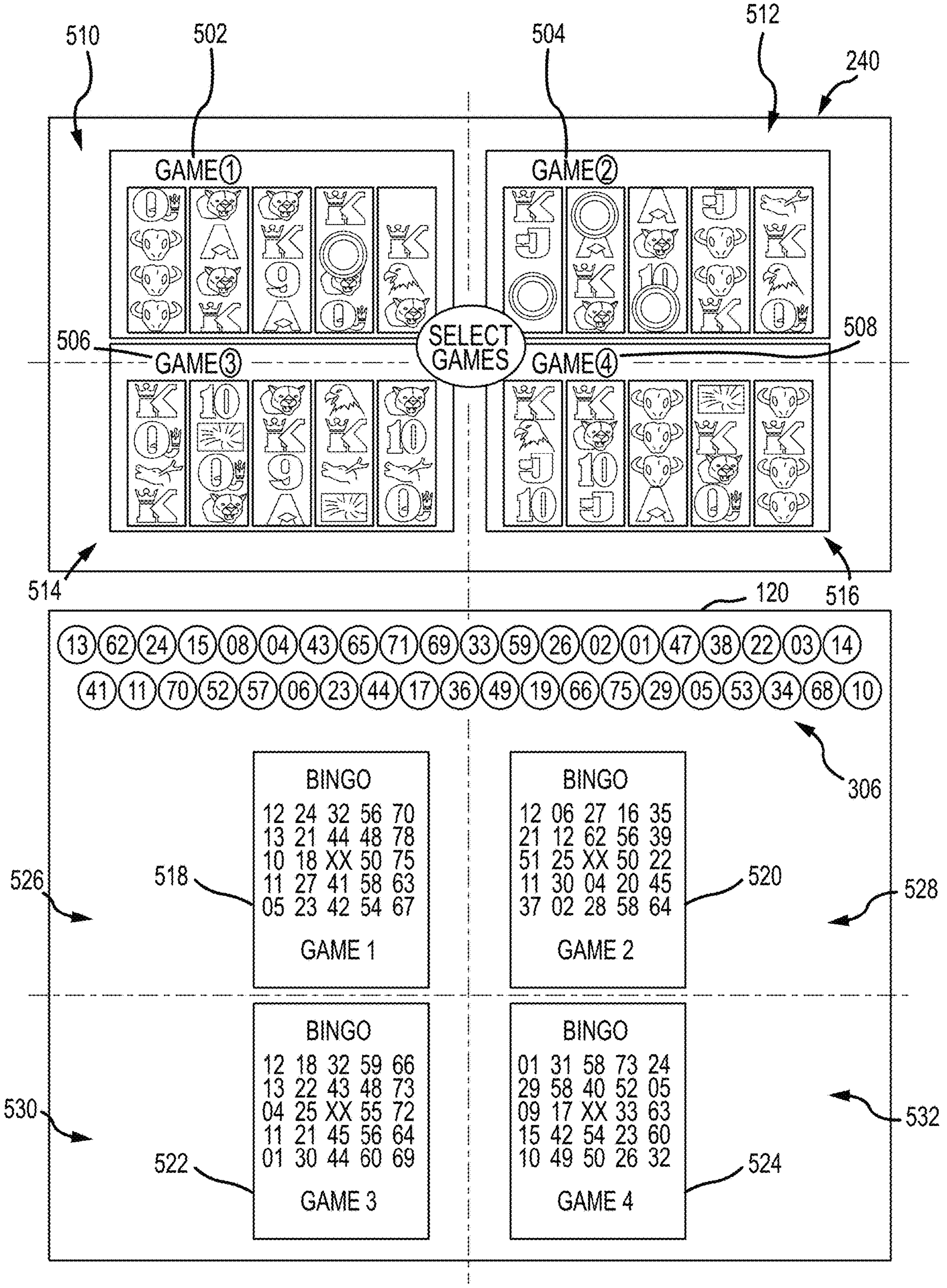
FIG. 5 is a screenshot of the example Class II multi-game bingo game described with reference to FIG. 4.

FIG. 4 is a flowchart illustrating a process 400 for providing a Class II multi-game bingo game 500. FIG. 5 is a screenshot of the example Class II multi-game bingo game 500 (described with reference to FIG. 4). FIG. 4 and FIG. 5 are discussed together below.

Accordingly, in the example embodiment shown in FIG. 5, bingo game 500 includes one or more player selectable subgames. For example, bingo game 500 may include, as shown, a first subgame 502, a second subgame 504, a third subgame 506, and a fourth subgame 508. Each subgame 502-508 may be displayed in a quadrant of a display device, such as, in this example, primary game display 240. For instance, first subgame 502 may be displayed in a first quadrant 510, second subgame 504 may be displayed in a second quadrant 512, third subgame 506 may be displayed in a third quadrant 514, and fourth subgame 508 may be displayed in a fourth quadrant 516.

Each subgame 502-508 may be associated with a desired game presentation. More particularly, as described in detail herein, an outcome of each subgame 502-508 may be based upon a bingo game outcome. However, each bingo game outcome may be presented in a variety of ways. Specifically, a game presentation (or "façade") may be adjusted or changed for each subgame 502-508 as desired. In the example embodiment, a presentation of each subgame 502-508 is a reel game presentation. However, it will be appreciated that any desired presentation may be used. For instance, any Class III "Las Vegas style" or "slot game" presentation may be used, including, as shown, any reel game presentation.

As a result, at least one specific improvement to the technical field of Class II wagering games is that players who wish to play Class III "Las Vegas style" games may be provided access to the desired game presentation, even in gaming jurisdictions (e.g., Amer-Indian gaming jurisdictions) limited to Class II gaming. Further, although many implementations may map bingo game outcomes to Class III game presentations, as described above, in at least some embodiments, one or more subgames 502-508 may include a traditional Class II presentation. Specifically, in at least some embodiments, one or more subgames 502-508 may present a bingo card or another bingo game presentation.

Accordingly, in at least some embodiments, each subgame 502-508 may include one or more reels. In the example embodiment, each subgame 502-508 includes five reels. However, it will be appreciated that any suitable number of reels may be included in each subgame 502-508. It will also be appreciated that the number of reels may differ from subgame to subgame To illustrate, first subgame 502 may, in at least one embodiment, include a single reel, while fourth subgame 508 may, in at least one embodiment, include ten or more reels. Again, although each subgame 502-508 includes reels in the illustrated example, it will be appreciated that any suitable game, such as any suitable game typically played on a Class III slot machine (or "slot game") may be implemented.

Thus, bingo game 500 may include a plurality of player selectable subgames 502-508, each of which may be associated with a distinct bingo game outcome. In particular, a plurality of bingo game outcomes may be determined from a plurality of subgame bingo cards and mapped to or otherwise provided in association with each subgame 502-508 presentation. For example, in a four subgame 502-508 implementation, each player of bingo game 500 may be provided up to four subgame bingo cards, one per selected subgame 502-508, each time the player places a wager. In alternative embodiments, bingo game 500 may include any number of subgames 502-508 that enables bingo game 500 to function as described herein. For example, and without limitation, as discussed below with respect to FIG. 6, in some alternative embodiments, bingo game 500 includes two subgames each associated with a subgame bingo card. In further alternative embodiments, bingo game 500 includes eight or more subgames each associated with a bingo subgame card.

Each player of bingo game 500 may also be provided a gaming ending win (GEW) bingo card (not shown), which may be used to determine whether to conclude a current round of bingo game 500, where a bingo round may conclude by removing or purging an existing bingo number listing 306 and generating a new bingo number listing 306. As a result, the subgame bingo cards provided each time the player places a wager may be regarded as "interim" or "non-game-ending" bingo cards, in that a game outcome of each subgame 502-508 may be determined using each of the subgame bingo cards during generation of bingo number listing 306 and prior to any player achieving a game ending win. In addition, a player of bingo game 500 may be provided many interim bingo cards in association with many plays of one or more selected subgames 502-508 during a single round of bingo game 500 (i.e., prior to a game ending win being achieved by at least one player). In some embodiments, a condition other than a GEW may be used to determine whether to conclude a current round of bingo game 500, in which case, players may or may not be provided GEW bingo cards.

In the example embodiment, a server, such as bingo server 107, may generate bingo number listing 306 (step 402). In the parlance of bingo games, bingo number listing 306 may also be referred to as a "ball call." In some embodiments, bingo number listing 306 may be provided on a display screen of button deck 120. In other embodiments, bingo number listing 306 is provided on a display of EGM 104A-104X, such as any of topper display 216, secondary game display 242, and/or primary game display 240. Similarly, in some embodiments, bingo number listing 306 may be provided on display 228 of player tracking interface 232. More generally, bingo number listing 306 may be displayed in any suitable location and/or on any suitable display screen.

In certain embodiments, bingo server 107 does not generate a bingo number listing 306 until a valid bingo game has been established. This may require at least 2 players to play the bingo game. Since the present disclosure includes multiple simultaneous played bingo games from a single EGM against a single bingo ball call, by initially two or more games in accordance with the present disclosure, the requirement of a bingo game may be satisfied by a single player. Further, in some embodiments, bingo number listing 306 may be continuously generated, even, for example, where a player has not placed a wager or has yet to place a wager. In other words, bingo server 107 may generate one ball call after another, irrespective of whether any player is currently participating in bingo game 500. In some embodiments, bingo number listing 306 may be displayed in response to a player placing a wager (step 404). Thus, in some cases, bingo server 107 may continuously generate bingo number listing 306, but bingo number listing 306 may only be displayed in response to a player wager. As described herein, the first forty numbers or "balls" of bingo number listing 306 may be substantially simultaneously displayed, and the next thirty-five numbers of balls selected and/or displayed, one at a time, in short intervals (e.g., one or two seconds) until bingo number listing reaches seventy-five total balls called.

If, during display of bingo number listing 306, a game ending win (GEW) is achieved by any player participating in bingo game 500, bingo server 107 may begin generation of bingo number listing 306 anew, removing previously selected balls from being displayed and starting over with a new bingo number listing 306. Similarly, if bingo server 107 reaches the end of bingo number listing 306 generation (e.g., if all seventy-five balls are called) and no player has achieved a GEW, bingo server 107 may also begin a new generation of bingo number listing 306. As described herein, a GEW may be determined by evaluating the GEW bingo card of each player for a GEW bingo pattern, such as a "blackout" or "all spots" pattern. If any player achieves such a pattern, a new bingo number listing 306 and/or new subgame bingo cards may be provided to each player of bingo game 500.

Accordingly, to initiate bingo game 500, a player of an EGM 104A-104X may place a wager (e.g., using a "Spin" or "Play" button, as described herein) and/or select one or more subgames 502-508 to play. To select a subgame 502-508, a player may tap or touch the subgame 502-508 if subgames 502-508 are displayed on a touchscreen or touch-sensitive display. In some cases, a player may use one or more mechanical pushbuttons of button deck 120 to select one or more subgames 508-508.

In some embodiments, a player may not be provided an option to select from subgames 502-508. Rather, in some embodiments, all subgames 502-508 may be automatically selected for participation each time a player places a wager. However, in the example embodiment, a player may select any of subgames 502-508 to play. The player may not, in addition, need to provide a distinct or additional wager for each subgame 502-508 selected. Rather, a single wager may selection of any number of subgames 502-508. In another embodiment, however, a player may provide an independent wager for each subgame 502-508 and/or specify a percentage or portion of a single wager to allocate to each subgame 502-508.

In response to a player placing a wager, a first subgame bingo card 518 may be evaluated against bingo number listing 306 to determine a first bingo subgame outcome (step 406). Likewise, depending upon subgames 502-508 selected by the player, a second subgame bingo card 520, a third subgame bingo card 522, and a fourth subgame bingo card 524 may be evaluated against bingo number listing 306 to determine a second bingo subgame outcome, a third bingo subgame outcome, and/or a fourth bingo subgame outcome, respectively (steps 408, 410, and 412). In certain embodiments, the evaluation of the bingo cards 518-524 against the bingo number listing 306 may depend on a time when the wager button is pressed by the player. In other words, at the moment the wager button is pressed, the bingo number listing may not be complete (not all 80 numbers may have been determined). For example, if only 2 players are engaged in playing the bingo game, once the second player places a wager (assuming the first player has placed a wager already), the bingo game begins and a portion of the bingo number listing (first 40) may be determined. The bingo cards of the two players will be evaluated against the portion of the bingo number listing as it existed when the wagers were placed, and if the wager was placed before the bingo number listing was generated, then the portion (first 40) is used to determine the outcome. After the portion is generated, a number may be determined every n seconds (say 1 second) to add to the bingo game listing. After 5 seconds have elapsed and a total of 45 numbers of the bingo number listing have been determined, a third player may place a wager. The third player's outcome may be determined based on the bingo number listing at that point, which now includes the 45 numbers. In certain embodiments, the four subgame bingo cards may be evaluated against a portion of the bingo number listing which is substantially the same of the four bingo cards. If a player wanted to play four games simultaneously prior to the present disclosure, they would have to wager on four successive bingo games, each having variances in the bingo number listing, due to the different times at which each of the successive four bingo games were initiated. Therefore, another improvement provided with the present disclosure is the ability to wager multiple games against a same portion of a bingo number listing.

In addition, a GEW bingo card (not shown) may also be evaluated to determine whether a game ending win has occurred (step 414). As described herein, if at least one player of bingo game 500 has achieved a game ending win, the player may be provided a game ending win award (steps 414 and 416). In some embodiments, the game ending win award is a nominal award (e.g., one penny), because GEW bingo cards may be primarily used for determining when to generate a new bingo number listing 306 and ensuring compliance with one or more Class II regulatory or jurisdictional requirements.

Accordingly, in response to any player of bingo game 500 achieving a game ending win, bingo server 107 may begin generation of a new bingo number listing 306. In addition, each player participating in bingo game 500 may be provided one or more new subgame bingo cards 518-522 for evaluation against the new bingo number listing 306, such as, for example, in based upon a wager of each player and player selection of one or more subgames 502-508.

In various embodiments, the evaluation of subgame bingo cards 502-508 may take place on a player's EGM 104A-104X and/or on bingo server 107. For example, if bingo card evaluation takes place on a player's EGM 104A-104X, bingo server 107 may periodically provide a group of bingo cards to each player's EGM 104A-104X. These bingo cards may include subgame bingo cards 518-524 and GEW bingo cards, although there may, in at least some embodiments, be no distinction between subgame and GEW bingo cards themselves other than that subgame bingo cards 518-524 are used to evaluate subgame outcomes, and GEW bingo cards are used to determine whether a game ending win has occurred. Each time a player places a wager and selects one or more subgames 502-508, the player's EGM 104A-104X may (randomly or in list order) select one or more bingo cards from the group of bingo cards stored on the player's EGM 104A-104X for comparison to bingo number listing 306.

Similarly, where the bingo card evaluation is performed by bingo server 107, it may be unnecessary to periodically provide a group of bingo cards to each player's EGM 104A-104X, because bingo server 107 may select subgame bingo cards 518-524 and GEW bingo cards for each player participating in bingo game 500. In this (server based) embodiment, one specific improvement to the technical field of Class II wagering is EGM 104A-104X memory and processing resources may be preserved for other operations, as bingo server 107 (equipped with greater memory and processing resources) may perform the bulk of the storage and processing operations. EGM security may also be improved, as game data (i.e., bingo cards) may not be stored locally on any EGM, thereby removing the bingo cards used during bingo game 500 from the risk of local hacking and/or other tampering efforts occurring on a casino floor.

In either case, each bingo subgame outcome (or interim bingo game outcome) may be mapped to a presentation of a respective subgame. In the example embodiment, the first bingo subgame game outcome is mapped to a reel outcome or reel presentation of first subgame 502. Likewise, the second bingo subgame outcome is mapped to a reel outcome or reel presentation of second subgame 504, the third bingo subgame outcome is mapped to a reel outcome or reel presentation of third subgame 506, and the fourth bingo subgame outcome is mapped to a reel outcome or reel presentation of fourth subgame 508.

Furthermore, one of bingo server 107 and EGM 104A-104X may store the selected bingo cards for a multi-game bingo game in a game history log of the memory of either the player's EGM 104A-104X or the bingo server 107. In particular, at least some gaming jurisdictions require that game outcomes be logged for an amount of time after game play has occurred so that, for example, the gameplay outcomes may be verified at a later time. In the example embodiment of FIG. 5, after EGM 104A-104X selects cards 518-524, EGM 104A-104X associated cards 518-524 together as corresponding to a single multi-game bingo game in the game history log of the memory of EGM 104A-104X. Thus, each multi-game bingo game log entry in the game history log of EGM 104A-104X may include multiple linked bingo cards (e.g., cards 518-524) to identify each of the cards that were selected in a single multi-game bingo game. In alternative embodiments, the cards 518-524 are each linked and logged on a game history log of bingo server 107.

More generally, although not central to an understanding of the present disclosure, a bingo game outcome may be mapped to a reel presentation using a lookup table that correlates one or more bingo game outcomes (e.g., all possible bingo game outcomes) in a one-to-one, one-to-many, many-to-one, or many-to-many relationship to one or more reel outcomes or reel stopping positions. A variety of standard mapping algorithms are known in the art and are not described in additional detail herein.

Each subgame bingo card 518-524 provided to a player may also be shown or displayed for the player to view. In the example embodiment, subgame bingo cards 518-524 are shown on a display of button deck 120 under bingo number listing 306. In addition, a portion of button deck 120 may be divided into quadrants matching or visibly associated with quadrants 510-516 of primary game display 240. As a result, the subgame bingo cards 518-524 used during bingo game 500 may be displayed in a quadrant to intuitively and visibly correspond to a respective quadrant of a subgame 502-508.

In the example of FIG. 5, button deck 120 includes a first quadrant 526 (visibly associated with first quadrant 510 and/or first subgame 502), a second quadrant 528 (visibly associated with second quadrant 512 and/or second subgame 504), a third quadrant 530 (visibly associated with third quadrant 514 and/or third subgame 506), and a fourth quadrant 532 (visibly associated with fourth quadrant 516 and/or fourth subgame 508). One specific improvement associated with this method of organizing and displaying subgame bingo cards is that a player may easily and intuitively grasp a correspondence between one or more selected subgames 502-508 and one or more displayed subgame bingo cards 518-524.

Bingo server 107 and/or each EGM 104A-104X may, in addition, determine a subgame award to provide to a player based upon each respective bingo subgame outcome. For example, each bingo subgame outcome may be mapped to a reel outcome or reel presentation, which may, in turn, be mapped (e.g., in a paytable) to a subgame award. In another embodiment, each bingo subgame outcome may be mapped by a lookup table to a respective reel presentation, and by a separate paytable, to a subgame award. In either case, a player's credit balance may be increased by a value of each subgame award at the conclusion of each subgame evaluation and/or reel presentation.

One advantage (and specific improvement to the technical field of bingo games) of providing a plurality of subgame bingo cards 518-524 in association with a plurality of subgames 502-508 is that a variableness or variety of game outcomes may be increased by conducting independent (random) bingo subgame determinations for each subgame 502-508 of the multi-game bingo game 500. For example, if a single subgame bingo card were used and its outcome mapped to each subgame 502-508, the number of available reel presentations across each of the twenty reels (i.e., five reels each over four subgames 502-508 for a total of twenty reels) would be much less than the number of outcomes available as a result of the presently described manner of subgame outcome determination. Stated another way, mapping a single subgame bingo card to a plurality of subgame 502-508 reel presentations would result in a game that players might become quickly accustomed to our bored with, in that the total number of available outcomes and/or subgame presentations would be much less (and therefore more predictable or simply "stale" from a player perspective) than the number of outcomes and/or subgame presentations available by way of the presently described method. For example, a multi-game bingo game that included four subgames (e.g., 502-508), the outcomes of which are determined by a single bingo card, results in fewer potential game outcomes to display to the user, as a single win generated by the bingo card can only be mapped to the outcomes of the four separate subgames 502-508 in a relatively low number of award outcomes. To illustrate further, in at least one hypothetical example, if each bingo game (of the four example bingo games) has 1000 award outcomes, then, before removing overlapping sums of awards, there may be approximately 1 trillion award outcomes. However, if only combined outcomes were awarded, then the same amount of Class II data may only support about 4000 award outcomes.

An additional specific improvement of the present disclosure is that a multi-game bingo game 500 may be provided in which a single bingo number listing 306 (e.g., a ball call) may be generated and used to determine the outcome of a plurality of different subgames on a single EGM 104A-104X. For example, in some embodiments of the present disclosure, the bingo number listing 306 is generated by bingo server 107 and transmitted to a player's EGM 104A-104X. After a player initiates a game, the player's EGM 104A-104X may (randomly or in list order) select one or more bingo cards from a group of bingo cards stored on the player's EGM 104A-104X for comparison to the single bingo number listing 306. For example, in the embodiment shown in FIG. 5, bingo server 107 transmits bingo number listing 306 and the player's EGM 104A-104X selects five bingo cards. In particular of the five selected bingo cards, four (e.g., 518-524) are each linked to one of the subgames 502-508 and a fifth bingo card (not shown) is designated as a "game end win" card. Each of the four bingo cards 518-524 are each compared to the bingo number listing 306 to determine the outcome of each respective subgame 502-508. Thus, in such embodiments, the single bingo number listing 306 generated by the bingo server 107 is used to determine the outcome of each subgame 502-508. As a result, the bingo server 107 does not need to generate distinct bingo number listings 306 for each subgame of the multi-game bingo game 500, thereby preserving memory and processing resources of bingo server 107.

As described briefly above, another specific improvement of the present disclosure is that a multi-game bingo game 500 may be provided in compliance with Class II regulatory requirements by using a GEW bingo card that delivers only a nominal game award (e.g., one penny). More particularly, one advantage of supplying a GEW bingo card associated with a nominal award value is that the GEW bingo card may be used to control beginning and ending of a round of bingo (e.g., when bingo number listing 306 is re-generated) without substantially (if at all) affecting return to player (RTP) of bingo game 500, while an outcome of each subgame 502-508 may be controlled or determined individually for each player based solely upon a respective subgame bingo card 518-524 provided to the player in response to each player wager and subgame selection. Another advantage of the present disclosure is that, by having a single GEW per multigame play, the situation where a player could potentially be determined to be playing bingo against themselves may be avoided (where this situation may potentially raise a regulatory concerns).

Figure 6:
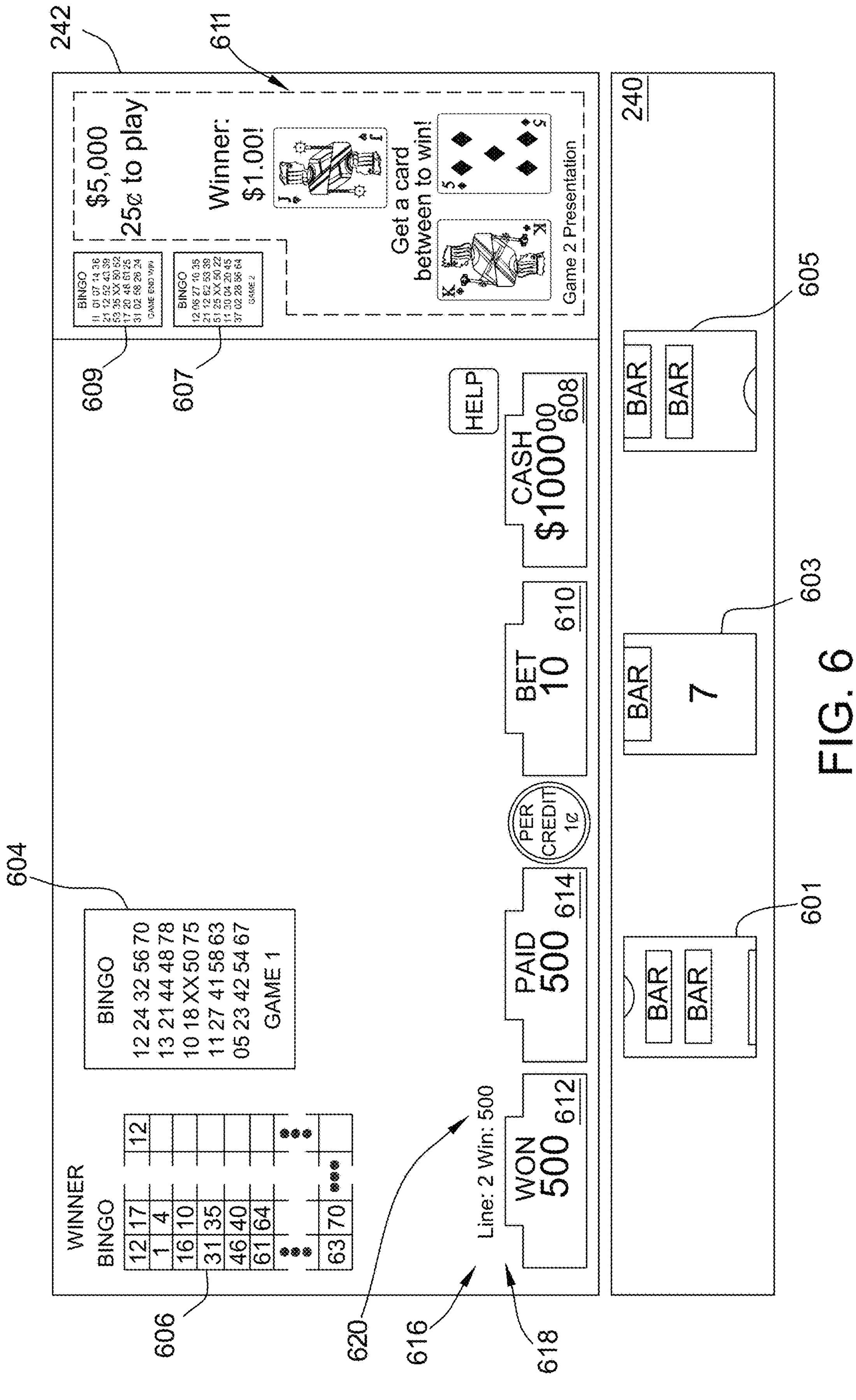
FIG. 6 is another example of a Class II bingo game being displayed in the EGM of FIG. 2.

FIG. 6 depicts another example of a Class II bingo game being displayed in the primary game display 240 and secondary game display 242 of the EGM 200 of FIG. 2. In the example of FIG. 6, a plurality of reels 601, 603, and 605 are displayed within the primary game display 240. While only three reels 601, 603, 605 are shown in the example of FIG. 6, in some examples, more or fewer reels may be used. In some examples, the reels 601, 603, and/or 607 may be implemented as mechanical reels. As shown, each reel 601, 603, 605 has a plurality of symbol display positions for presenting symbols (and/or symbol combinations) which may be associated with winning and/or losing reel game outcomes and/or awards. The Class II bingo game of FIG. 6 is substantially similar to the Class II bingo game described above with respect to FIG. 3, except as described below.

In the example of FIG. 6, a "Game 1" bingo card 604 and a bingo number listing 606 are displayed in the secondary game display 242. As shown, the "Game 1" bingo card 604 comprises a matrix of bingo cells (e.g., squares). In some examples, the matrix may be a 5×5 matrix of 25 total cells. In some examples, the "Game 1" bingo card 604 may have a matrix of a different size (e.g., 3×3, 4×4, 4×5, 4×6, 6×6, 7×7, 3×8, 10×10, etc.). In some examples, the matrix may be larger or smaller. In the example of FIG. 3, each cell in the matrix of the "Game 1" bingo card 604 includes a number that is not repeated in any other cell of the "Game 1" bingo card 604. In the example of FIG. 6, a "Game 2" bingo card 607 and a "Game End Win" bingo card 609 are also displayed in the secondary game display 542. "Game 2" bingo card 607 and a "Game End Win" bingo card 609 are substantially similar (e.g., include a similarly sized matrix) as "Game 1" bingo card but include different numbers.

In the example of FIG. 6, the secondary game display 242 further displays a credit meter 608 showing an amount of money and/or credits (e.g. credit balance) held by a player of the EGM 200. In the example of FIG. 6, the credit balance 608 shows $1000. The secondary display 242 additionally shows a wager meter 610 adjacent to the credit meter 608, under "BET." In the example of FIG. 6, the amount wagered is 10 credits (e.g., $0.10). The amount wagered (e.g., via the user interface) may be deducted from the credit meter 608. The secondary game display 242 additionally displays a win meter 612 and a total win meter 614. In the example of FIG. 6, the win meter 612 is 500, indicating that the simulated combination of symbols in reels 601, 603, 605 is associated with a 500 award (which is equal to the award associated with the bingo game outcome). As shown, the total win meter 614 is also 500, indicating that the cumulative total of awards received comprises just that one 500 credit award. In the example of FIG. 6, the secondary game display 242 further displays reel win information 616. The reel win information 616 includes win line information 618 and award information 620. The win line information 618 indicates which win line in the reels 601, 603, 605 contains symbols comprising a winning reel game outcome. The award information 620 indicates an associated award amount for that winning reel game outcome.

The bingo server 107 may manage (and/or host) the bingo game, such as by generating the "Game 1" bingo card 604, the "Game 2" bingo card 607, the "Game End Win" bingo card 609, and/or bingo number listing 606. In some examples, the bingo cards 604, 607, 609 (and/or information on which the bingo cards 604, 607, 609 are based), and/or the bingo number listing 606 may be generated using an RNG. In some examples, the bingo cards 604, 607, 609 may be randomly selected from a set of bingo cards or a player may select their own bingo cards 604, 607, 609 (e.g., via the user interface), such as from a set of randomly generated bingo cards, for example. In certain embodiments, the bingo cards may be selected from a set of bingo cards that are stored on EGM 200. Once a threshold number of bingo cards of the set are used for gameplay, a new set may be requested by the EGM 200 from the bingo server 107.

In operation, a player and/or EGM 200 may be provided with the bingo cards 604, 607, 609, such as by bingo server 107. For example, a player may be provided a new bingo cards 604, 607, 609 each time a "Spin" or "Play" button is pressed by the player (e.g., via user interface), provided the player has made a wager. The bingo number listing 606 (e.g., "ball call") may be randomly generated, such as by bingo server 107. The bingo cards 604, 607, 609 may each be compared to the current bingo number listing 606, and numbered cells on the bingo cards 604, 607, 609 that match numbers in the bingo number listing 606 may be marked or "daubed" on the bingo cards 604, 607, 609. Finally, the marked or daubed bingo cards 604, 607, 609 may be evaluated against a paytable of winning bingo patterns.

A bingo game outcome may be determined by comparing one or more patterns of marked (and/or "daubed) cells of the bingo cards 604, 607, 609 with the paytable of winning bingo patterns. If each of the bingo cards 604, 607, 609 do not include a pattern that matches a pattern in the paytable of winning patterns, then a losing bingo outcome is determined for each of the bingo cards 604, 607, 609, and no award may be provided to the player. If one of the bingo cards 604, 607, 609 does include a pattern that matches a pattern in the paytable of winning patterns, then a winning bingo outcome is determined for the respective bingo card 604, 607, 609, and an award may be provided to the player.

The bingo game outcomes may be presented to the player via different game simulations. In the example of FIG. 6, a spinning reel game simulation is used to present the outcome of a first bingo game based on the "Game 1" bingo card 604 by spinning the plurality of reels 601, 603 and 605 in the primary game display 240. For each play of the bingo game, the first bingo game outcome is presented as a reel spin outcome in the reel game. In some examples, the spinning reel game simulation may operate by spinning each reel 601, 603, 605 and then stopping each reel 601, 603, 605 in a particular position to obtain a matrix of symbols. One or more combinations of symbols in the matrix of symbols may be associated with a reel game outcome that is equal to the main bingo game outcome. For example, a winning bingo game outcome for the first bingo game may be displayed as a winning combination of reels 601, 603 and 605. Similarly, a losing bingo game outcome may be displayed as a losing combination of reels 601, 603 and 605. Different outcomes of the bingo game may be displayed as different outcomes in the spinning reel game. Thus, the first bingo game outcome is presented to the player as a particular reel spin outcome of reels 601, 603 and 605.

In the example of FIG. 6, a side game simulation is used to present the outcome of a second bingo game based on the "Game 2" bingo card 607 in the secondary gaming display 242. In particular, secondary game display 542 includes a side game display area 611 to display the outcome of the second bingo game. In the example of FIG. 6, the results of the side game are determined by comparing the "Game 2" bingo card 607 to the bingo number listing 606. More specifically, in the example of FIG. 6, the side game displayed is a card draw game, in which three cards are presented in the side display area. Two cards of the cards are revealed with a message indicating that a win is indicated by a third card being revealed to be in-between the two previously revealed card. In such embodiments, the "Game 2" bingo card 607 is compared to the bingo number listing 606 to determine whether a win has occurred. If the "Game 2" bingo card 607 is determined to contain a win based on the comparison with the bingo number listing 606, the EGM 104A-104X controls the display to reveal a third card (e.g., a Jack as shown in FIG. 6) that is in-between the two covered cards. If the "Game 2" bingo card 607 is determined to not contain a win based on the comparison with the bingo number listing 606 the EGM 104A-104X controls the display to reveal a third card that is not between the two covered cards. In particular, in the example embodiment of FIG. 6, the three cards are revealed on the display only after EGM 104A-104X determines whether the "Game 2" bingo card 607 contains a win. In alternative embodiments, the side game simulation may include any simulation that is capable of conveying a bingo game outcome. In various embodiments, the display of the side game is not tied to the display of the primary game. In other words, both games can be played concurrently, and their outcomes do not affect either game. Additionally, since each game uses their own bingo card, each game may start and end at different time points.

Figure 7:
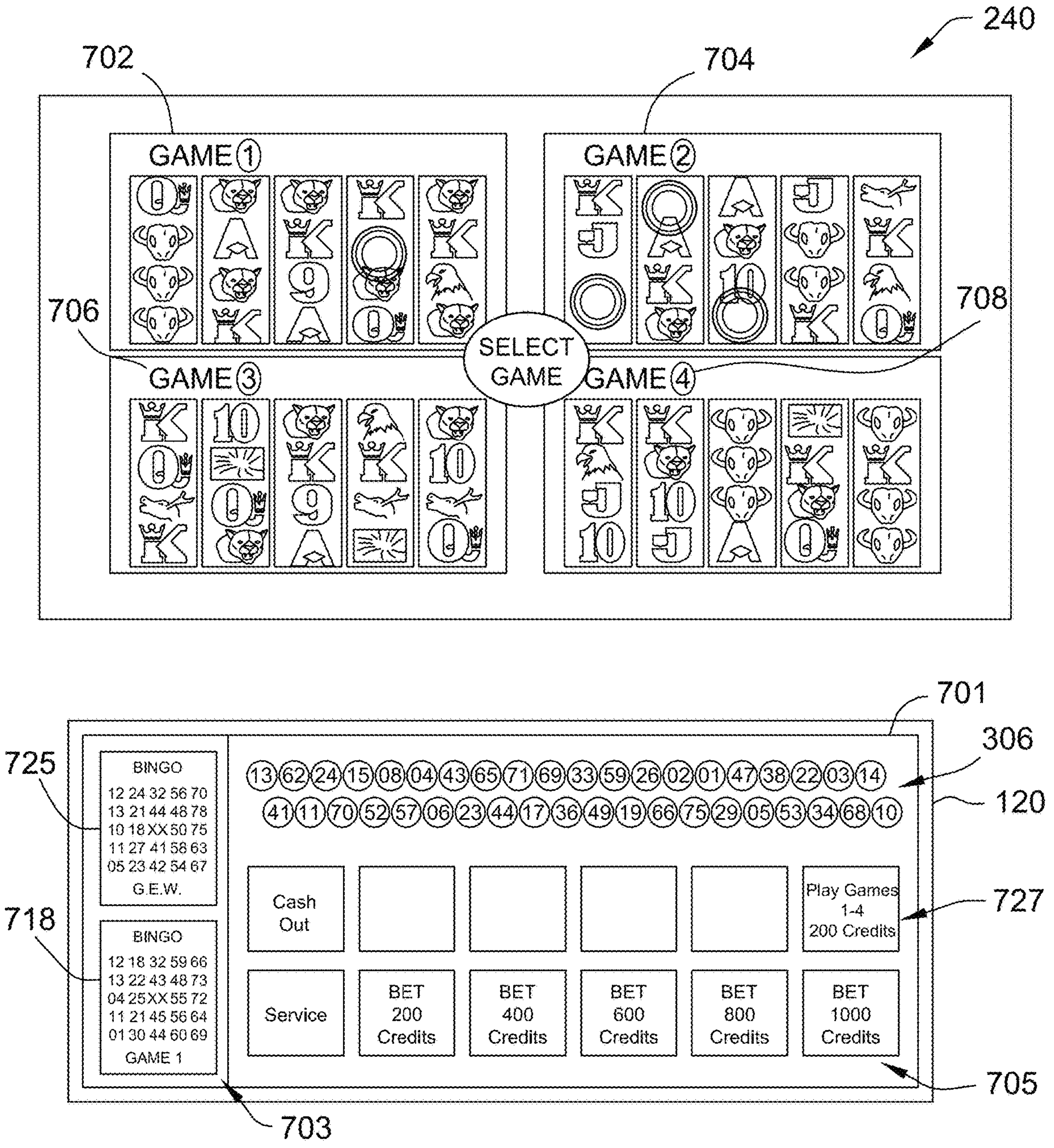
FIG. 7 is a screenshot of yet another example of a Class II bingo game being displayed in the EGM of FIG. 2.

FIG. 7 is a screenshot of yet another example Class II multi-game bingo game 700. In the example embodiment shown in FIG. 7, bingo game 700 includes one or more player selectable subgames. For example, bingo game 700 may include, as shown, a first subgame 702, a second subgame 704, a third subgame 706, and a fourth subgame 708. In the example embodiment, bingo game outcomes for each of the subgames 702-708 may be determined from a corresponding plurality of subgame bingo cards and mapped to or otherwise provided in association with each subgame 702-708 presentation. For example, in the four subgame 702-708 implementation, each player of bingo game 700 may be provided up to five bingo cards, including one subgame bingo card for each selected subgame 702-708, and a game ending win bingo card 725 each time the player places a wager. Accordingly, the Class II bingo game 700 of FIG. 7 is substantially similar to the Class II bingo game 500 described above with respect to FIGS. 4 and 5, except as described below.

In the example embodiment, button deck 120 includes a button deck display screen 701 having a card display region 703 and an interface region 705. More specifically, in the example embodiment, button deck display screen 701 includes a user interface such as, but not limited to, a touch screen or touch-sensitive display interface spanning at least a portion of button deck display screen 701. In the example embodiment, button deck display screen 701 is configured to display GEW card 725 and each of the bingo cards corresponding to each of the subgames 702-708 in the card display region 703 of button deck display screen 701. More specifically, in the example embodiment, the button deck display 701 displays the GEW card 725 and one of the subgame bingo cards below the GEW card 725. During gameplay, button deck display 701 may cycle the displayed bingo card that is associated with one of the subgames 702-708, while maintaining the display of the GEW card 725. For example, as shown in FIG. 7, the Game 1 bingo card 718, corresponding to the first subgame 702 is displayed below the GEW card 725. In some embodiments, button deck display 701 may cycle through the displayed subgame bingo card by replacing the Game 1 bingo card 718 with each of the remaining bingo cards (not shown) corresponding to the second, third, and fourth subgames 704-708, sequentially, such that all subgame cards are displayed to the player during and/or at the end of the game. In other embodiments, button deck display 701 may also cycle the GEW card 725 in addition to and/or instead of the first subgame card 718. One specific improvement associated with this method of organizing and displaying subgame bingo cards is that a player may intuitively view each of the subgame bingo cards while preserving area of the button deck display 701 to display other information/player selectable options by cycling each of the subgame bingo cards 718.

Additionally, in some embodiments, button deck display 701 displays each subgame bingo card substantially simultaneously with the display of the game outcome of each of subgames 702-708 on primary display 240. For example, in some such embodiments, button deck display 701 displays first subgame bingo card 718 below GEW card 725 at the same time as primary display 240 displays an outcome of the first subgame 702 (e.g., by stopping spinning reels in first subgame 702). After the first subgame 702 outcome has been displayed, primary display 240 may then display an outcome for second subgame 704 and button deck display 701 may simultaneously replace the first subgame bingo card 718 with a second subgame bingo card (not shown) corresponding to the second subgame 707. In further embodiments, button deck display 701 may display any of subgame bingo cards and GEW card 725 based on suitable criteria. For example, and without limitation, in some embodiments, button deck display 701 may display subgame bingo cards in response to a player selection made using the touch interface of button deck display screen 701.

In the example embodiment, the bingo number listing 306 and a plurality of player selectable options 727 are displayed in the interface region 705 of the button deck display 701. The player selectable options 727 are selectable by a player to control at least one of a wager, subgame selection, credit withdrawal, and/or a service request. In alternative embodiments, player selectable options 727 may include any suitable player selectable options. In further alternative embodiments any one of bingo number listing 306, bingo cards 718-725, and player selectable options 727 may be displayed in any suitable location on button deck display screen 701 and/or on any suitable display screen.

Systems and methods for providing a multi-game bingo game are thus provided. In various embodiments, a plurality of player selectable subgames are provided and displayed during the multi-game bingo game, such as, for example, in different sections or areas of a game display. An outcome of each subgame may be determined based upon an independent bingo game outcome. For example, if four subgames are provided, four subgame bingo cards may be evaluated to generate four subgame outcomes. In addition, the subgame outcomes may be associated with or mapped to any of a variety of game presentations, such as any Class III slot game presentation. In at least one embodiment, each subgame outcome is mapped from a bingo outcome to a reel game presentation. Each player participating in the bingo game may also be provided a game ending win bingo card, which may be associated, as described herein, with a nominal award value, and which may be used to determine a beginning and ending of each round of bingo, where each player may place many wagers for many subgame outcomes, during a single round of bingo.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one display device;

at least one memory with instructions stored thereon; and at least one processor in communication with the at least one memory, wherein the instructions, when executed by the at least one processor, cause the at least one processor to:

cause display of a first game of a multi-game bingo game in a first display area of the at least one display device;

cause display of a second game of the multi-game bingo game in a second display area of the at least one display device;

determine a first outcome for the first game based upon an evaluation of a first bingo card associated with the first display area;

determine a second outcome for the second game based upon an evaluation of a second bingo card associated with the second display area;

cause display, on the at least one display device, of at least one simulation communicating at least one of the first outcome or the second outcome; and determine whether a game ending win (GEW) condition has been achieved on any of a plurality of bingo cards for the multi-game bingo game, the plurality of bingo cards including the first bingo card and the second bingo card.

2. The electronic gaming device of claim 1, wherein the evaluation of the first bingo card comprises comparing the first bingo card against a bingo number listing.

3. The electronic gaming device of claim 2, wherein the instructions further cause the at least one processor to determine the bingo number listing based on a message received from a server.

4. The electronic gaming device of claim 3, wherein the evaluation of the second bingo card comprises comparing the second bingo card against the bingo number listing.

5. The electronic gaming device of claim 1, wherein the plurality of bingo cards includes a GEW bingo card associated with a nominal game award and utilized as part of determining whether the GEW condition has been achieved.

6. The electronic gaming device of claim 1, wherein the instructions further cause the at least one processor to, when the GEW condition is achieved, replace the first bingo card and the second bingo card.

7. The electronic gaming device of claim 1, wherein the instructions further cause the at least one processor to cause display of the at least one simulation by causing display of a first simulation communicating the first outcome and causing display of a second animation communicating the second outcome.

8. The electronic gaming device of claim 1, wherein the instructions further cause the at least one processor to cause display of the at least one simulation based on a mapping of the at least one of the first outcome or the second outcome to at least one reel outcome stored in at least one lookup table in the at least one memory, wherein the at least one simulation comprises the at least one reel outcome.

9. At least one non-transitory computer-readable storage medium with instructions stored thereon that, in response to execution by at least one processor, cause the at least one processor to:

determine a first outcome for a first game of a multi-game bingo game based upon an evaluation of a first bingo card associated with a first display area;

determine a second outcome for a second game of the multi-game bingo game based upon an evaluation of a second bingo card associated with a second display area;

cause display of a first simulation associated with the first outcome in the first display area;

cause display of a second simulation associated with the second outcome in the second display area; and determine whether a game ending win (GEW) condition has been achieved on any of a plurality of bingo cards for the multi-game bingo game, the plurality of bingo cards including the first bingo card and the second bingo card.

10. The at least one non-transitory computer-readable storage medium of claim 9, wherein the evaluation of the first bingo card comprises comparing the first bingo card against a bingo number listing.

11. The at least one non-transitory computer-readable storage medium of claim 10, wherein the evaluation of the second bingo card comprises comparing the second bingo card against the bingo number listing.

12. The at least one non-transitory computer-readable storage medium of claim 9, wherein the instructions further cause the at least one processor to cause display of the first simulation by transmitting a message associated with the first outcome to a gaming device where the first display area is displayed.

13. The at least one non-transitory computer-readable storage medium of claim 9, wherein the instructions further cause the at least one processor to cause display of the second simulation by transmitting a message associated with the second outcome to a gaming device where the second display area is displayed.

14. The at least one non-transitory computer-readable storage medium of claim 9, wherein the plurality of bingo cards includes a GEW bingo card associated with a nominal game award and utilized as part of determining whether the GEW condition has been achieved.

15. The at least one non-transitory computer-readable storage medium of claim 9, wherein the instructions further cause the at least one processor to, when the GEW condition is achieved, replace the first bingo card and the second bingo card.

16. The at least one non-transitory computer-readable storage medium of claim 9, wherein the instructions further cause the at least one processor to cause display of the first simulation based on a mapping of the first outcome to at least one reel outcome in at least one lookup table, wherein the first simulation comprises the at least one reel outcome.

17. A method of electronic gaming implemented by at least one processor in communication with at least one memory, the method comprising:

determining a first outcome for a first game of a multi-game bingo game based upon an evaluation of a first bingo card associated with a first display area;

determining a second outcome for a second game of the multi-game bingo game based upon an evaluation of a second bingo card associated with a second display area;

causing display of a first simulation associated with the first outcome in the first display area;

causing display of a second simulation associated with the second outcome in the second display area; and determining whether a game ending win (GEW) condition has been achieved on any of a plurality of bingo cards for the multi-game bingo game, the plurality of bingo cards including the first bingo card and the second bingo card.

18. The method of claim 17, wherein the evaluation of the first bingo card comprises comparing the first bingo card against a bingo number listing received from a server.

19. The method of claim 18, wherein the evaluation of the second bingo card comprises comparing the second bingo card against the bingo number listing.

20. The method of claim 17, further comprising causing display of at least one of the first simulation or the second simulation by transmitting at least one message associated with at least one of the first outcome or the second outcome to a gaming device where the first display area and the second display area are displayed.

* * * * *